United States Patent [19]

Slavata

[11] Patent Number: 4,879,573

[45] Date of Patent: Nov. 7, 1989

[54] CLAMPING FRAME FOR CONTACT PRINTERS OF WORKING MASKS

[75] Inventor: Bohumil Slavata, Prague, Czechoslovakia

[73] Assignee: TESLA, koncernovy podnik, Prague, Czechoslovakia

[21] Appl. No.: 185,004

[22] Filed: Apr. 22, 1988

[30] Foreign Application Priority Data

Apr. 24, 1987 [CS] Czechoslovakia .................... 2899-87

[51] Int. Cl.⁴ ............................................. G03B 27/28
[52] U.S. Cl. ..................................... 355/125; 355/91; 355/94
[58] Field of Search .................... 355/91, 94, 125, 126

[56] References Cited

U.S. PATENT DOCUMENTS

| | | | |
|---|---|---|---|
| 3,604,800 | 9/1971 | Jordan et al. | 355/91 |
| 3,751,250 | 8/1973 | Moscony et al. | 355/91 |
| 4,007,987 | 2/1977 | Sheets . | |
| 4,054,383 | 10/1977 | Lin et al. | 355/91 |

Primary Examiner—Monroe H. Hayes
Attorney, Agent, or Firm—Klein & Vibber

[57] ABSTRACT

A clamping frame for contact printers of working masks in the semiconductor industry enables the application of packings made of easily obtainable raw materials and limits tangential forces acting on masks of the original and copy. A first packing and a second packing with a supporting frame between both packings is provided. The supporting frame prevents transmission of tangential forces to packings which come in contact with masks of the original and of the copy.

7 Claims, 2 Drawing Sheets

CLAMPING FRAME FOR CONTACT PRINTERS OF WORKING MASKS

FIELD OF THE INVENTION

The invention relates to a clamping frame of a contact printer of working masks applied in the semiconductor industry.

BACKGROUND OF THE INVENTION

The following known prior U.S. Patents are incorporated herein by reference: 4,360,226 to Takeuchi et al for Contact Printing Method and Apparatus; 4,054,383 to Somers et al for Jig and Process for Contact Printing; 4,007,987 to Sheets for Vacuum Contact Printing System and Process for Electronic Circuit Photomask Replication; 3,941,475 to Sheets for Optical Microcircuit Printing System; 3,834,815 to Greig for Photocopying Apparatus with Vacuum Means; and 3,658,417 to Lewis et al for Contact Printing Apparatus and Method.

In known contact printers of working masks, the system of a two part printing chamber with a vacuum generated thrust force is generally applied. Both parts of such a printing chamber are provided with identical clamping frames for the masks so that a clamping frame of the original forms with a respective part of the chamber a vacuum space for clamping the mask of the original. A clamping frame for a copy together with a second part of the chamber forms a similar space for clamping the mask of the copy (the working mask). Both masks are generally of the same size and usually of rectangular shape. The stable part of the chamber is provided at the bottom either with a collimating lens or with an opening for passage of light for the exposure. The bottom of the mobile part of the chamber is provided with a filter for observation of interference bands. After closing of both parts of the chamber with inserted masks for the original and for the copy, a central space is created between both parts, which, after connection to a source of vacuum, and, in case of airing of both external spaces, creates the required thrust force acting on both inserted masks. The masks contact, by their circumferential parts, packings which are maintained in place within recesses of the bodies of the clamping frames by means of thrust frames by clamping screws. A free part of the surface of the packings is left between the external circumference of the masks and the opening at the bottom of the recess of the clamping frame, enabling movements of the masks in order to secure their mutual correct contact in the course of copying.

However, simultaneously, an unwelcomed deflection of the extending surfaces of the packings in a direction towards the central space takes place, whereby tangential stresses are generated in the masks, which are distributed irregularly around the circumference of the masks, creating unacceptable faulty positions of the motive (image) of the original against the motive (image) of the copy. Said faults are minimized by application of some special materials for packings, the reinforcing insert of which has to show the same stiffness in two mutually perpendicular directions (perpendicular to two adjacent edges of masks). The packing material must furthermore prevent any sticking of the masks on the surface of the packings. Critical stress points of the packings are at the contact places of corners of masks with packings, where two mutually perpendicular directions of deflections cross. At these places, also changes of the stiffness due to fatigue of the material takes place and thus an increase of the position fault beyond the allowed limit. This fatigue of the packing material is experienced approximately after four months. Known packings usually comprise a rubber gasket reinforced by a textile fabric. Due to the high price and due to difficulties in securing similar packings, the operating costs of the whole arrangement are substantially increased.

SUMMARY OF THE INVENTION

It is an object of this invention to eliminate said drawbacks and to provide an arrangement where packings would not engage the masks directly, but by way of a stiff supporting frame which would, in addition, support the packing in case of a deflection within a substantial part of its width.

The arrangement according to this invention comprises two clamping frames of similar design, each of which is provided with a plate with a central opening with an external recess, against the bottom of which a packing is pressed by a thrust frame, connected with the body of the clamping frame by clamping screws. The first packing is situated between the bottom surface of the external recess and the thrust frame. A substantial feature of this invention is that an additional internal recess is provided in the body of the clamping frame, against the bottom of which internal recess another second packing rests with a radial and axial clearance and between both packings, a supporting frame is provided with a radial and axial clearance. The openings of both packings and of the supporting frame are coincident and of equal dimensions, and circumferences of the packings create similar overlappings on the masks, as they extend beyond the edges of the masks of the original and of the copy. The opening in the bottom of the internal recess has an allowance, such that it is larger than the maximum dimension of the masks of the original and of the copy. The opening of the thrust frame has an overlapping such that it is smaller than the opening in the bottom part of the internal recess. The supporting frame can be provided with packing projections on faces near the circumference of its opening.

The unwelcomed tangential forces are eliminated in such a way that at first, an external packing does not act on the mask directly, but by way of a stiff supporting frame, which supports also the first, external, packing within a substantial width and, therefore, a substantial reduction of tangential forces acting on the stiff supporting frame is obtained. Thus, requirements on the quality of this packing are substantially reduced so that this packing can be made from commonly obtainable materials, such as plain non-reinforced rubber. The internal recess of the body of the clamping frame serves solely for fixation of the position of the second, internal, packing. This second packing can also be made from commonly obtainable raw materials, of course only from such materials which do not cause any sticking of the packing on the surface of masks, for instance from silicon rubber and the like.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENT

Figure 1:
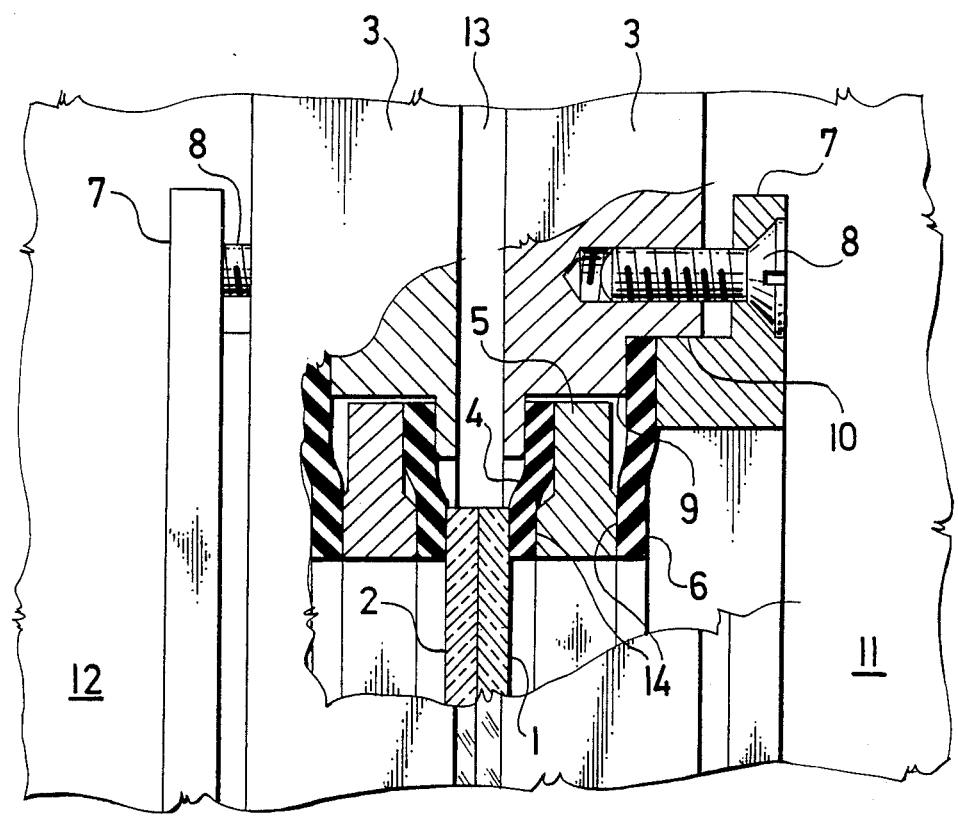
FIG. 1 shows in elevation a partial section of an embodiment of a closed vacuum chamber at a moment where the central space is evacuated and the external spaces are aired.
Figure 2:
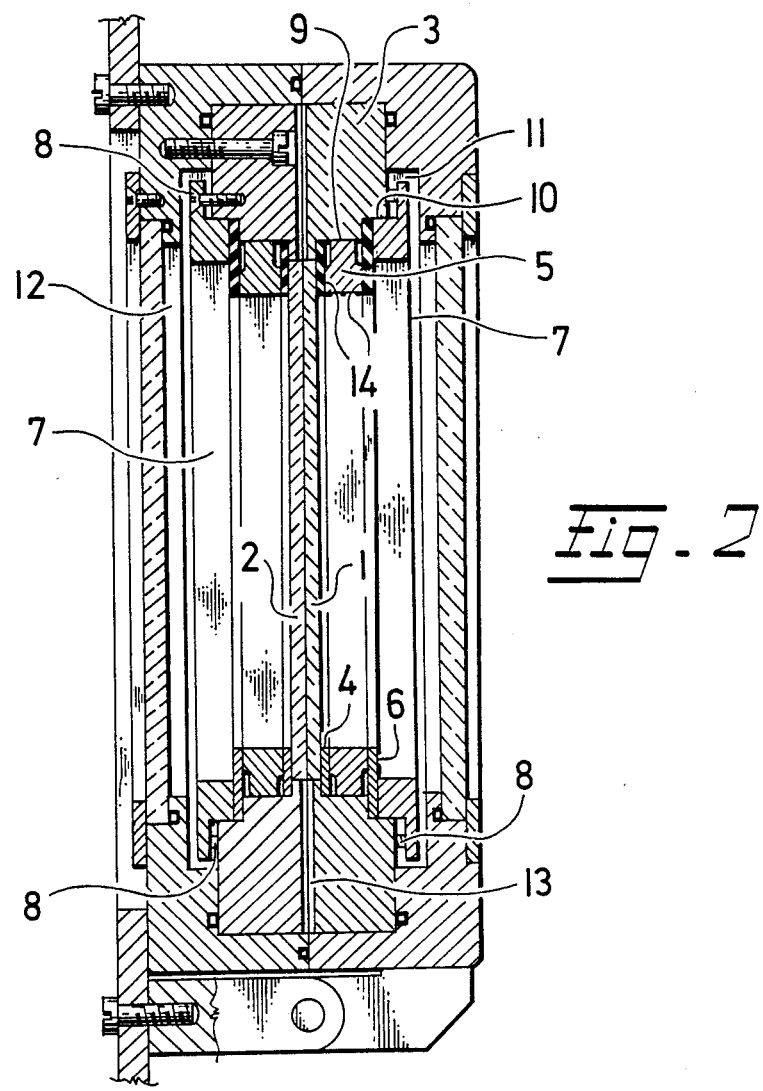
FIG. 2 is similar to FIG. 1, but shows a full sectional view.
Figure 3:
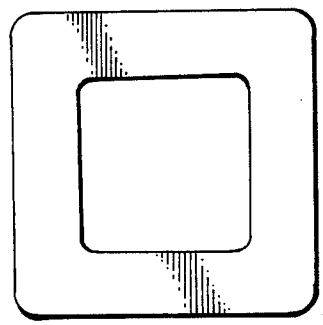
FIG. 3 is a plan view of the profile of a packing.

With reference to the drawings, the clamping frame for contact printers of working masks comprises two equally shaped parts, a stable part and a mobile part adapted to be brought to a closed and opened position either by a sliding movement or by turning. The stable part of the chamber with the clamping frame of the contact printer where the mask for the original 1 is inserted (in the drawings, the right part) is shown in sectional view. The mobile part of the chamber (in the drawings, the left part) where the mask for the copy 2 is inserted in a mirror image of the stable part.

Each of said parts comprises a clamping frame, the body 3 of which has the shape of a plate with a central opening 13. Within said opening an external recess 10 is provided and against its bottom surface a first packing 6 rests, situated between said bottom surface of the external recess 10 and a thrust frame 7. The thurst frame 7 is connected to the body 3 of the clamping frame by clamping screws 8. An internal recess 9 is furthermore provided in the body 3 of the clamping frame. A second packing 4 rests against the bottom surface of said internal recess 9 with a radial and axial clearance. A supporting frame 5 is provided between both packings 4 and 6 with a radial and axial clearance. Openings of the second packing 4, of supporting frame 5, and of first packing 6, are coincident and are, by an overlapping, smaller than the external dimensions of both masks 1, 2 for the original and the copy respectively.

The opening of the bottom of the internal recess 9 has an allowance, that is, it is larger than the maximum external dimension of the masks 1, 2 of the original and the copy respectively. The opening of the thrust frame 7 is by an allowance smaller than the opening of the bottom of the internal recess 9. The supporting frame 5 can be provided with packing projections 14 on both sides along its opening. The packing protection 14 facing the second packing 4 enables increasing the thickness of the bottom of the internal recess 9 in case of application of thin masks 1, 2 of the original and copy. The packing projection 14 on the opposite side of the supporting frame 5 creates a prestress of the first packing 6, securing its contact with the supporting frame 5.

The mask 1 of the original, generally a glass plate with the pattern of the original, is inserted into the stable part so as to take a place determined by not shown stops, and the mask 2 of the copy is inserted similarly into the mobile part of an open printing chamber. The masks are maintained in their positions by a lower vacuum pressure of about 90 kPa enabling manipulation of the mobile part of the chamber and securing a certain small distance (about 1 mm) between both masks 1, 2 after closing of both parts of the chamber.

After closing, the mobile part of the chamber comes in contact with a packing on the stable part of the chamber, whereby the internal spaces of the chamber are tightened against the surrounding space. At this phase of the cycle the masks 1, 2 of the original and copy are, due to underpressure in the spaces 11, 12 of the original and copy respectively, pressed against the supporting frame 5 by way of the second packing 4. Due to said forces, the whole system is shifted so that the supporting frame 5 comes in contact with the first packings 6 and by way of said packings 6 with projecting parts of the surface of the thrust frames 7 extending beyond the recess 10. Thus, simultaneously the spaces 11, 12 of the original and copy are packed with respect to the aired central space 13 as the first packing 6 acts solely in case of an overpressure in the spaces 11, 12 of the original and copy with respect to the central space 13. This mentioned overlapping causes furthermore a mechanical deviation of the internal edge of the first packing 6 in a direction towards the supporting frame 5 in case of overpressure in spaces 11, 12 of the original and copy. This contributes to a reliable functioning of the first packing 6.

In the course of a further phase of the cycle, the spaces 11, 12 of the original and copy and the central space 13 are evacuated to a full vacuum. Thus, the whole system is released and the masks 1, 2 of the original and copy are, due to the elasticity of first packing 6, mutually approaching. In the course of the third phase of the cycle the spaces 11, 12 of the original and copy are aired and therefore the masks 1, 2 of the original and copy are pressed against each other due to overpressure of the surrounding space. In the course of this phase the quality of contact is checked (by interference bands) and the exposure of the mask 2 of the copy is performed. After a repeated evacuation of spaces 11, 12 of the original and copy and of the central space 13 to a full vacuum, the masks 1, 2 of the original and copy are separated and, after following airing of the central space 13 and introduction of a slight retaining vacuum in spaces 11, 12, the arrangement is prepared for opening of the mobile part of the chamber in order to remove the exposed and to insert a new not exposed mask 2 of the copy.

Although the invention is described and illustrated with reference to a single preferred embodiment thereof, it is to be expressly understood that it is in no way limited to the disclosure of such preferred embodiment but is capable of numerous modifications within the scope of the appended claims.

I claim:

1. A clamping frame for a contact printer comprising a stable part and a mobile part of substantially equal design, each of said parts comprising a clamping frame body with a central opening, each body being separated by a central passage;
   said central opening having a two stepped profile formed by an external recess and an internal recess, such that the central opening is smaller at said internal recess, facing said central passage;
   a thrust frame and a supporting frame and a first and second packing;
   said second packing lying adjacent said internal recess with and said supporting frame lying adjacent said second packing;
   said first packing lying adjacent said external recess and said thrust frame lying adjacent said first packing.

2. A clamping frame for a contact printer as claimed in claim 1, further comprising
   said first packing, said second packing, and said supporting frame having coincident central openings smaller than the central opening of the body at said internal recess.

3. A clamping frame for a contact printer as claimed in claim 2, further comprising
said thrust frame having a central opening smaller than the central opening of the body at said external recess, but larger than the central opening of said supporting frame.

4. A clamping frame for a contact printer as claimed in claim 3, further comprising
said second packing having a radial and axial clearance.

5. A clamping frame for a contact printer as claimed in claim 4, further comprising
said supporting frame having a radial and axial clearance.

6. A clamping frame for a contact printer as claimed in claim 5, further comprising
the central openings of said supporting frame and said packings being smaller than a photomask to be printed, but the central opening of said body being larger than said photomask.

7. A clamping frame for a contact printer as claimed in claim 6, further comprising
said supporting frame having a plurality of projections adjacent its central opening, said projections being in contact with said first and second packings.

* * * * *